(12) United States Patent
Bird et al.

(10) Patent No.: US 8,732,140 B2
(45) Date of Patent: May 20, 2014

(54) METHODS FOR STORING FILES IN A DISTRIBUTED ENVIRONMENT

(75) Inventors: Robert Bird, Longwood, FL (US); Matthew Whitlock, Longwood, FL (US)

(73) Assignee: Red Lambda, Inc., Longwood, FL (US)

( * ) Notice: Subject to any disclaimer, the term of this patent is extended or adjusted under 35 U.S.C. 154(b) by 77 days.

(21) Appl. No.: 13/479,684

(22) Filed: May 24, 2012

(65) Prior Publication Data

US 2012/0303631 A1 Nov. 29, 2012

Related U.S. Application Data

(60) Provisional application No. 61/489,541, filed on May 24, 2011.

(51) Int. Cl.
*G06F 17/30* (2006.01)
(52) U.S. Cl.
USPC .......................................... 707/696

(58) Field of Classification Search
USPC .................................. 707/711, 741
See application file for complete search history.

(56) References Cited

U.S. PATENT DOCUMENTS

| | | | |
|---|---|---|---|
| 7,443,321 B1 * | 10/2008 | Kaufman et al. | 341/87 |
| 2007/0204128 A1 * | 8/2007 | Lee et al. | 711/173 |
| 2008/0189429 A1 * | 8/2008 | DaCosta | 709/231 |
| 2010/0106695 A1 | 4/2010 | Calder | |

* cited by examiner

*Primary Examiner* — Baoquoc N To
(74) *Attorney, Agent, or Firm* — Stephen J. Leahu; Carton Fields Jorden Burt, PA

(57) ABSTRACT

A system and method for storing data-files stored on distributed devices connected to a network. Data-elements of the data-files are allocated to data-blocks stored on the distributed devices. Key-identifiers are calculated for each of the data-blocks based on the allocated data-elements. The key-identifiers are stored in distributed tables stored on the distributed devices. Index-nodes are generated for the data-files based on the data-blocks. A Paxos algorithm is executed for the index-nodes based on the key-identifiers to provide a consensus of the data-files that are stored on the plurality of distributed devices.

26 Claims, 3 Drawing Sheets

METHODS FOR STORING FILES IN A DISTRIBUTED ENVIRONMENT

This non-provisional patent application claims priority to, and incorporates herein by reference, U.S. Provisional Patent Application No. 61/489,541 filed May 24, 2011.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The presently disclosed invention relates in general to the field of storing data, and in particular to systems and methods for storing files in a distributed computing environment.

BACKGROUND OF THE INVENTION

Distributed file systems for storing data across multiple storage units are known in the art. Such file systems, however, do not scale well in distributed environments. The presently disclosed invention addresses that limitation by providing a file system and method based on distributed tables that is both flexible and efficient, as well as being highly distributable.

SUMMARY OF THE INVENTION

The presently disclosed invention may be embodied in various forms, including a system, a method or computer readable medium for storing data.

An embodiment of such a system may comprise, inter alia, data-blocks stored on a plurality of distributed devices. The distributed devices may be adapted to be connected via a network. The distributed devices may store data-files. The data-files may comprise data-elements. The stored data-elements may be allocated to the data-blocks.

Key-identifiers may be calculated for each of the data-blocks. The key-identifiers may be based on the allocated data-elements of the corresponding data-blocks. Distributed tables may store the key-identifiers. The distributed tables may be stored on the distributed devices. Index-nodes for the data-files may be generated based on the data-blocks. The index-nodes may comprise a list of the data-blocks. The index-nodes may be stored in a metadata-store. A Paxos algorithm may be executed for the index-nodes based on the key-identifiers to provide a consensus of the data-files that are stored on the plurality of distributed devices.

Similarly, an embodiment of a method for the presently disclosed invention may include the step of allocating data-elements of stored data-files to data-blocks. The stored data-files may be stored on distributed devices. The distributed devices may be connected to a network. In addition, the data-blocks may be stored on the distributed devices. The method may include the step of calculating key-identifiers for each of the data-blocks. The key-identifiers may be based on the allocated data-elements of the corresponding data-blocks. The key-identifiers may be stored in distributed tables. The distributed tables may be stored on the distributed devices.

The method may comprise generating index-nodes for the data-files based on the data-blocks. The index-nodes may comprise a list of the data-blocks. The index-nodes may be stored in a metadata-store on the distributed devices. A Paxos algorithm may be performed for the index-nodes based on the key-identifiers to provide a consensus of the data-files that are stored on the distributed devices.

In an embodiment, the key-identifiers may comprise hash values. In addition, the distributed tables may be distributed hash tables. The key-identifiers may be globally unique block-identifiers.

The data-blocks may be binary large objects. The binary large objects may have a maximum predetermined size. The binary large objects may have different file sizes. Each of the binary large objects may be associated with a unique address. Each unique address may be based on the allocated data-elements of the corresponding binary large object. In certain embodiments, the stored data-files may be allocated to data-blocks based on a Kademlia algorithm. The data-blocks may be logically grouped together. Further, each one of the data-blocks may be read and written as a single unit.

In an embodiment, the method may further comprise the step of generating directory index-nodes for a plurality of index-nodes. The directory index-nodes may be stored in the metadata-store.

The steps of the method may be performed by a plurality of processors operably connected to the distributed devices and adapted to communicate across the network.

In an embodiment, the method may further comprise the steps of receiving a request to modify an index-node and executing a Paxos algorithm for a quorum of nodes that correspond to the data-blocks having near-values in the distributed table. The near-values may be hash values that are within a predetermined range of a hash value of the index-node. Further, the method may include modifying the index-node based on an outcome of the Paxos algorithm, and modifying the nodes in the quorum based on the modified index-node. A consensus of the nodes may be provided based on the outcome of the Paxos algorithm.

Such a consensus may be provided by executing voting-rounds for a quorum of nodes. In certain embodiments, the voting-rounds may comprise the step of sending round-invitations to the nodes in the quorum. The nodes in the quorum are acceptors, as defined herein. The method may include receiving replies from each acceptor. The replies may be round-acceptances comprising a last-voted-value and a round-number. The round-number may represent the voting-round in which the corresponding acceptor voted the last-voted-value. Further, the method may include selecting a value based the last-voted-values received from the acceptors.

In certain embodiments, a method may comprise sending vote-invitations to the Acceptors. The vote-invitations may comprise the selected value. The value may be selected upon receiving the last-voted-values from a majority of the acceptors. Further, the method may comprise sending a value-announcement from the acceptors to the nodes in the quorum. The value-announcement may comprise the selected value. The nodes in the quorum may reject a value that is different from the selected value.

In an embodiment, at least one of the index-nodes may be encoded based on an Abstract Syntax Notation One (ASN.1) encoding standard. At least one of the index-nodes may be encoded based on a Distinguished Encoding Rules (DER) message-transfer syntax. Further, the Distinguished Encoding Rules (DER) message-transfer syntax may be based on a X.690 International Telecommunication Union (ITU)-T recommendation.

In certain embodiments, the method may further comprise the step of receiving a round-invitation by an acceptor from a coordinator. The round-invitation may comprise a generation-number. In addition, the method may comprise sending an inquiry by the acceptor to the coordinator only if the generation-number in the round-invitation is greater than a generation-number of the acceptor. The method may comprise sending a notification by the acceptor to the coordinator only if the generation-number in the round-invitation is less than the generation-number of the acceptor. Also, the generation-number in the round-invitation may be equal to the generation-number of the acceptor. If such is the case, then the method may comprise: (i) sending a round-begun notification by the acceptor to the coordinator only if a round-number in the round-invitation is less than the record-number of the acceptor; (ii) ignoring the round-invitation by the acceptor only if the round-number in the round-invitation is equal to the round-number of the acceptor; and, (iii) updating the round-number in the acceptor to match the round-number in the round-invitation and sending a round-acceptance to the coordinator only if the round-number in the round-invitation is greater than the round-number in the acceptor.

In an embodiment, a method may further comprise the step of receiving a round-acceptance by a coordinator from an acceptor. The round-acceptance may comprise a generation-number. In addition, the method may comprise ignoring the round-acceptance by the coordinator only if the generation-number in the round-acceptance is different from the generation-number of the coordinator. Also, the generation-number of the coordinator may be equal to the generation-number of the round-acceptance. If such is the case, then the method may comprise ignoring the round-acceptance by coordinator only if the round-number in the round-acceptance is different from the round-number on the coordinator. Furthermore, if such is the case that the generation-number of the coordinator is equal to the generation-number of the round-acceptance, and only if the round-number in the round-acceptance is equal to the round-number on the coordinator, then the method may comprise: (a) ignoring the round-acceptance by coordinator only if the coordinator has already received a round-acceptance from the acceptor in the current generation and round; and, (b) tracking by the coordinator the last-voted-value in the round-acceptance received from the acceptor only if the coordinator has not already received a round-acceptance from the acceptor in the current generation and round.

In an embodiment, a method may further comprise the step of receiving a round-acceptance by a coordinator from a majority of Acceptors. The majority of acceptors may be acceptors that received round-invitations from the coordinator, wherein the round-acceptance comprises a generation-number. The method may comprise selecting, by the coordinator, a last-voted-value. The last-voted-value may be a value that the coordinator received from the acceptor in the highest-numbered round. In addition, the method may comprise selecting a proposed-value by the coordinator only if the acceptors failed to vote in the current generation. In addition, the method may comprise sending, by the coordinator, a vote-invitation to each of the acceptors. In an embodiment, the vote-invitation may be either the last-voted-value or the proposed-value based on the above determinations. The vote-invitation may comprise the proposed-value only if the acceptors failed to vote in the current generation. The vote-invitation may comprise the last-voted-value only if the acceptors voted in the current generation.

In an embodiment, a method may comprise the step of receiving a vote-invitation by an acceptor from a coordinator. The vote-invitation may comprise a generation-number. The method may comprise ignoring the vote-invitation by the acceptor only if the generation-number in the vote-invitation is different from the generation-number on the acceptor. The generation-number of the acceptor may be equal to the generation-number of the vote-acceptance. If such is the case, then the method may comprise sending a round-begun notification by the acceptor to the coordinator only if a round-number in the vote-invitation is less than the record-number of the acceptor. Furthermore, if such is the case that the generation-number of the acceptor is equal to the generation-number of the vote-acceptance, and only if a round-number in the vote-invitation is equal to the record-number of the acceptor, then the method may comprise: (a) ignoring the vote-acceptance by acceptor only if the acceptor has already voted in the current generation and round; and, (b) sending a vote-announcement from the acceptor to learners listed in the vote-invitation only if the acceptor has not already voted in the current generation and round.

In embodiment, a method may further comprise the step of receiving a vote-announcement by a learner from an acceptor. The vote-announcement comprises a generation-number. Further, the method may comprise ignoring the vote-announcement by the learner only if the generation-number in the vote-announcement is different from the generation-number of the learner. The generation-number of the learner may be equal to the generation-number of the vote-announcement. If such is the case, then the method may comprise ignoring the vote-announcement by the learner only if the round-number in the vote-announcement is less than the round-number of the learner. Furthermore, if such is the case that the generation-number of the learner may be equal to the generation-number of the vote-announcement, and only if a round-number in the vote-announcement is equal to or greater than the record-number of the learner, then the method may comprise: (a) ignoring the vote-acceptance by learner only if the learner has already received a vote-announcement from the acceptor in the current generation and round; and, (b) tracking by the learner the vote received from the acceptor only if the learner has not already received a vote-announcement from the acceptor in the current generation and round.

In an embodiment, a method may further comprise the step of receiving a vote-announcement by a learner from a majority of acceptors. The vote-announcements may have a predetermined majority-number for determining a quantity needed for the majority of acceptors. The vote-announcements may comprise a generation-number and a value. Only if the values of all of the vote-announcements are equal, then the learner tracks the value of the vote-announcements and the learner increments the generation-number for a next-iteration of the Paxos algorithm.

In an embodiment, a method may further comprise the step of receiving a round-begun notification by the coordinator to the acceptor. The method may comprise ignoring the round-begun notification by the coordinator only if the generation-number in the round-begun notification is different from the generation-number on the coordinator. Only if the generation-number in the round-begun notification is equal to the generation-number on the coordinator, then the method may comprise: (i) ignoring the round-begun notification by the coordinator only if the round-number in the round-begun notification is less than or equal to the round-number on the coordinator; and (ii) selecting, by the coordinator, a new round-number that is greater than the round-number in the round-begun notification and sending a round-invitation to each of the acceptors only if the round-number in the round-begun notification is greater than the round-number on the coordinator.

In an embodiment, a method may further comprise the step of receiving an inquiry from a sender by a receiver. The sender may be a sending-node, and the receiver may be a receiving-node. The method may comprise sending a notification by the receiver to the sender. The notification may comprise a generation-number and a value of the receiver. Only if the sender receives the notification, then the method may comprise (i) ignoring the notification by the receiver only if the generation-number in the notification is less than the generation-number of the receiver; and (ii) only if the generation-number in the notification is equal to or greater than the generation-number on the receiver, then the receiver tracks the value in the notification and the receiver sets the generation-number in the receiver to a number equal to one value greater than the generation-number in the notification for the next-iteration of the Paxos algorithm.

BRIEF DESCRIPTION OF THE DRAWINGS

The foregoing and other objects, features, and advantages of the invention will be apparent from the following more particular description of embodiments as illustrated in the accompanying drawings, in which reference characters refer to the same parts throughout the various views. The drawings are not necessarily to scale, emphasis instead being placed upon illustrating principles of the invention.

DETAILED DESCRIPTION OF THE EMBODIMENTS

Reference will now be made in detail to the embodiments of the presently disclosed invention, examples of which are illustrated in the accompanying drawings.

One of the objects of the present system and method may be an application for storing files in a distributed computing environment in which the files are stored across multiple storage units in a distributed architecture. The object for certain embodiments may be a system or method in which parallel processing is utilized to achieve computational efficiency, such as, without limitation, a distributed network intrusion detection system. Embodiments may not be limited, however, to any one example application. Instead, certain embodiments may be applicable in virtually any application in which multiple processors in a distributed environment need to persist data to a file system that is stored across multiple storage units in an efficient manner while maintaining file system consistency across the distributed system. Accordingly, an object of the present system and method may be the implementation of a file system based on distributed tables which is both flexible and efficient, as well as being highly distributable.

Figure 1:
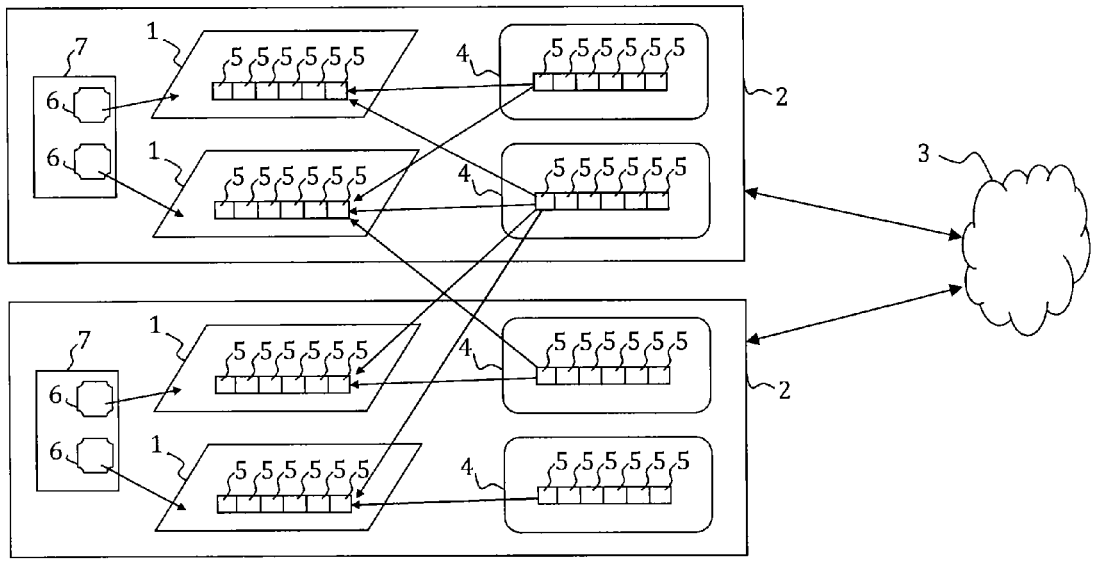
FIG. 1 is a block diagram illustrating components of an embodiment of a data storing system, in accordance with certain embodiments of the invention.

FIG. 1 is a block diagram illustrating components of an embodiment of a data storing system, in accordance with certain embodiments of the invention. As shown, such an embodiment may comprise data-blocks 1, which may be stored on a plurality of distributed devices 2. The distributed devices 2 may be adapted to be connected via a network 3. The distributed devices 2 may store data-files 4 that comprise data-elements 5. In an embodiment, the data-elements 5 may be data bytes. Further, the data-files 4 may be native files. The stored data-elements 5 may be allocated to the data-blocks 1.

Key-identifiers or keys 6 may be calculated for each of the data-blocks 1. The key-identifiers 6 may comprise hash values 6. Further, the key-identifiers 6 may be based on the allocated data-elements 5 of the corresponding data-blocks 1. Distributed tables 7 may store the key-identifiers 6. The distributed tables 7 may be distributed hash tables. The distributed tables 7 may be stored on the distributed devices 2.

Figure 2:
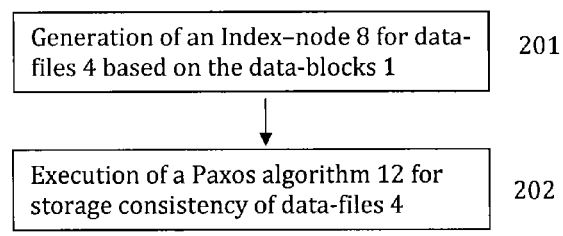
FIG. 2 is a flowchart illustrating index generation and Paxos algorithm execution, in accordance with certain embodiments of the invention.

Index-nodes 8 for providing a consensus 9 (not shown) among the data-files 4 may be generated 201 based on the data-blocks 1, as shown in FIG. 2. The index-nodes 8 for the representation of the data-files 4 may comprise a list 10 of the data-blocks 1 corresponding to the data-files 4. The index-nodes 8 may be stored in a metadata-store 11. A Paxos algorithm 12 may be executed 202 for the index-nodes 8 based on the key-identifiers 6 to provide storage consistency or consensus 9 (not shown) of the stored data-files 4 that are stored on the distributed devices 2.

Figure 3:
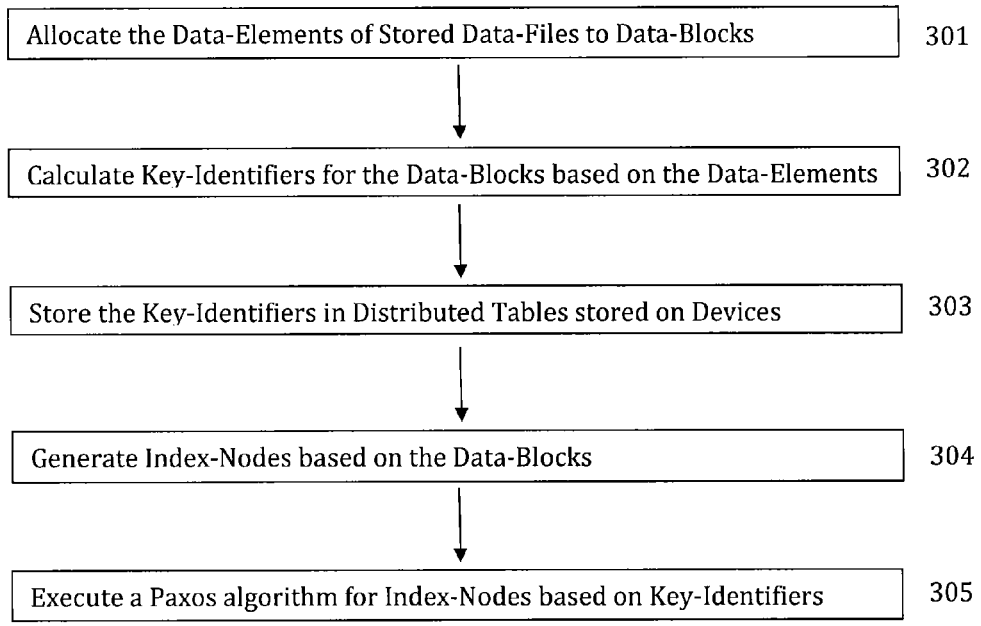
FIG. 3 is a flowchart illustrating steps of an embodiment of a data storing method, in accordance with certain embodiments of the invention.

FIG. 3 is a flowchart illustrating steps of an embodiment of a data storing method, in accordance with certain embodiments of the invention. As shown, such an embodiment may comprise the step of allocating 301 data-elements 5 of stored data-files 4 to data-blocks 1. The data-blocks 1 and the stored data-files 4 may be stored on distributed devices 2 connected to a network 3. Further, the method may comprise calculating 302 key-identifiers 6 for each of the data-blocks 1. The key-identifiers 6 may be based on the allocated data-elements 5 of the corresponding data-blocks 1.

In addition, the method may comprise the step of storing 303 the key-identifiers 6 in distributed tables 7. The distributed tables 7 may be stored on the distributed devices 2. Further, the method may include generating 304 index-nodes 8 based on the data-blocks 1. The index-nodes 8 may comprise a list 10 of the data-blocks 1, and may be are stored in a metadata-store 11. The method may also comprise executing 305 a Paxos algorithm 12 for the index-nodes 8 based on the key-identifiers 6 to provide storage consistency or consensus 9 (not shown) of the stored data-files 4 that are stored on the distributed devices 2.

In an embodiment, a Kademlia File System (KFS) may divide data or data-files 4 to be allocated into limited-size binary large objects or data-blocks 1 and store key-identifiers 6 of those data-blocks 1 in a disk-backed distributed hash table (DHT) 7. The stored data-blocks 1 are keyed by the hash values 6 of their content, the data-elements 5 allocated to the data-blocks 2. These key-identifiers 6 not only serve as an integrity check but also yield an automatic space-savings when multiple copies of the same file 4 are stored in the file system.

When a KFS simply implements a Kademlia DHT algorithm, replication and fault tolerance are inherent. The challenge of building a fully-distributed file system lies in handling concurrent modifications in a way that is provably correct in all cases, performs well, and maintains consistency even during network disturbances and node failures. A Paxos algorithm 12 is a generalized consensus algorithm that fulfills all of these requirements.

In an embodiment, an implementation of the Paxos algorithm 12 atop a Kademlia algorithm, herein entitled the K-PAX algorithm, may form the basis for the KFS metadata store 11. Inodes or index-nodes 8 may be stored in a metadata store 11, and may represent files 4 and directories. File inodes 8 store lists 10 of data-blocks 1 which contain the corresponding file's contents or allocate data-elements 5. Directory inodes 8 store lists of other inodes 8. Each inode 8 may serve as an independent consensus domain.

When a request 13 is received for an inode 8 to be modified, a quorum 14 of the DHT nodes 15 that are nearest to the inode's identifier 6 executes the Paxos algorithm 12 to agree upon the new contents of the inode 8. Reaching consensus 9 through the Paxos algorithm 12 guarantees that all nodes 15 in the quorum 14 recognize the same modification for the inode 8 and that any concurrent modification request which is not chosen by the quorum 14 does not take effect.

Figure 4:
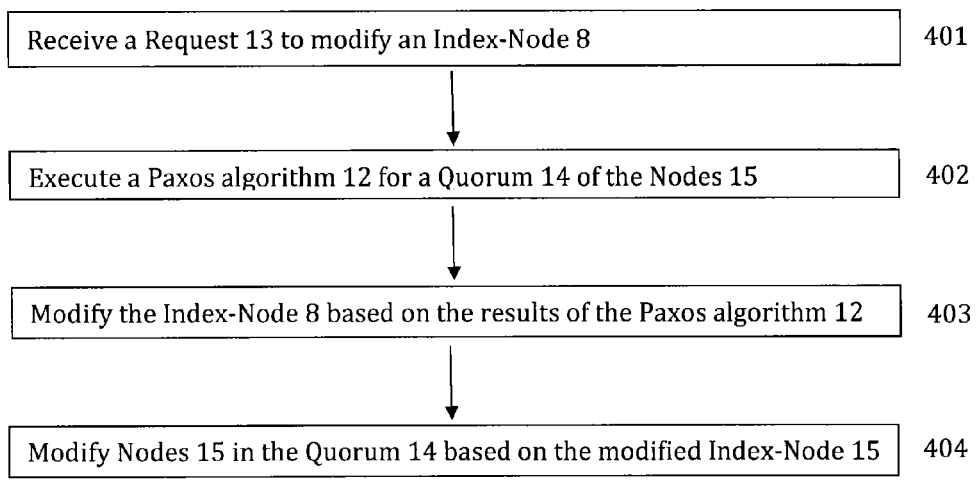
FIG. 4 shows a flowchart illustrating steps of an embodiment for modifying an index-node, in accordance with certain embodiments of the invention.

FIG. 4 shows a flowchart illustrating steps of an embodiment for modifying an index-node 8. The method described above may further comprise the step of receiving 401 a request 13 to modify an index-node 8. In addition, a Paxos algorithm 12 may be executed 402 for a quorum 14 of nodes 15 that correspond to the data-blocks 1 having near-values 6 in the distributed table 7. The near-values 6 are hash values 6 that are within a predetermined range of the hash value 6 of the index-node 8. The method also may include modifying 403 the index-node 8 based on an outcome of the Paxos algorithm 12, and modifying 404 the nodes 15 in the quorum 14 based on the modified index-node 8. A consensus 9 (not shown) of the modified nodes 15 may be provided based on the outcome of the Paxos algorithm 12.

The Paxos distributed consensus algorithm 12 enables a group of nodes 15 to reach a coherent agreement or consensus 9 despite the asynchronicity inherent in network communications. This objective is accomplished by making it impossible for two nodes 15 to have conflicting views of the consensus outcome.

A Paxos algorithm 12 may label the tasks of the processors by the roles that the processors perform in a protocol. These processors or Paxos agents, which implement an embodiment of the Paxos algorithm 12, may comprise a Proposer 16, a Coordinator 17, an Acceptor 18, and a Learner 19. A single processor may perform one or more roles at the same time as such multi-tasking improves the latency and throughput for a protocol without affecting the accuracy of the protocol. In certain embodiments, each Paxos agent can play one or more of the roles.

A Proposer 16 may propose a value 20 and request a Coordinator 17 to put the value 20 for a vote 21 over several voting-rounds 22 on ballots or round-invitations 23. The Coordinator 17 may drive the voting process by inviting Acceptors 18 to participate in voting rounds 22. In addition, the Coordinator 17 may collate the round-acceptances 24 from the Acceptors 18 to determine the value 20 for which the Acceptors 18 may vote 21, and the Coordinator 17 may invite via vote-invitations 25 Acceptors 18 to vote 21 for that value 20. An Acceptor 18 may casts votes 21, subject to the restriction that an Acceptor 18 may not cast more than one vote 21 per voting-round 22. The Acceptors 18 track their most recently voted value 26 in order to communicate this last-voted-value 26 to the Coordinators 17 in subsequent round acceptance-messages 27. The Acceptors 18 may announce their votes 21 to a set of Learners 19. The Learners 19 may tally the votes 21 and learn a new value 28 when a majority of the Acceptors 18 have voted for the new value 28 in a single voting-round 22.

In an embodiment, all Kademlia nodes 15 play the Paxos roles of Proposer 16, Coordinator 17, Acceptor 18, and Learner 19. As such, the distinctive use of these terms for Paxos agents is purely for clarity. Further, all messages may be for the same key-identifier 6. In an embodiment, many sequences of the Paxos algorithm 12 operate in parallel—one algorithm sequence for each key-identifier 6 in the distributed hash table (DHT) 7.

A consensus 9 may be provided by executing voting-rounds 22 for the nodes 15 in the quorum 14. The quorums 14 implemented by the Paxos algorithm 12 provide a benefit of ensuring that at least some surviving Paxos agents retain information from the results of past voting rounds 22. Quorums 14 may be defined as subsets of the set of Acceptors 18 such that any two subsets, i.e. quorums, share at least one member. A quorum 14 may be any majority of participating Acceptors 18.

In an embodiment, the Paxos algorithm 12 achieves consensus 9 by executing one or more voting-rounds 22. Each round 22 may proceed in two phases. In the first phase, the Coordinator 17, which is also the Proposer 16 in the K-PAX implementation, sends round invitations 23 to the nodes 15 in a quorum 14, known as Acceptors 18. Upon receiving a round invitation 23, each Acceptor 18 may reply with a round-acceptance 24 indicating the last value 26 for which the Acceptor 18 voted and the round-number 29 of the last vote round 32 in which the Acceptor 18 voted for that last voted value 26. As soon as the Coordinator 17 has received round acceptances 24 from a majority of the Acceptors 18, the Coordinator 17 selects a new value 28 and sends vote-invitations 25 to the Acceptors 18 bearing that selected new value 28. This begins the second phase of the round 22.

Figure 5:
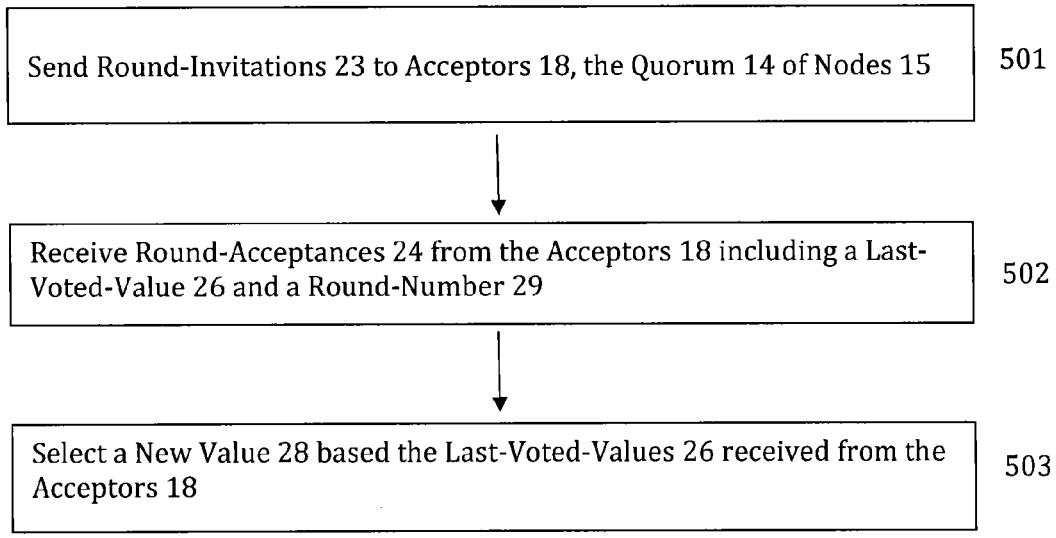
FIG. 5 shows a flowchart illustrating steps of an embodiment for voting-rounds, in accordance with certain embodiments of the invention.

FIG. 5 shows a flowchart illustrating steps of an embodiment for voting-rounds 22. The method described above may further comprise the step of sending 501 round-invitations 23 to the nodes 15 in the quorum 14. The nodes 15 in the quorum 14 may play the role of Acceptors 18. The method may comprise receiving 502 replies from each Acceptor 18. The replies may be round-acceptances 24 comprising a last-voted-value 26 and a round-number 29 of the last-vote-round 32. The round-number 29 of the last-vote-round 32 represents the round 22 in which the corresponding Acceptor 18 voted the last-voted-value 26. Further, the method may include the step of selecting 503 a new value 28 based the last-voted-values 26 received from the Acceptors 18.

Figure 6:
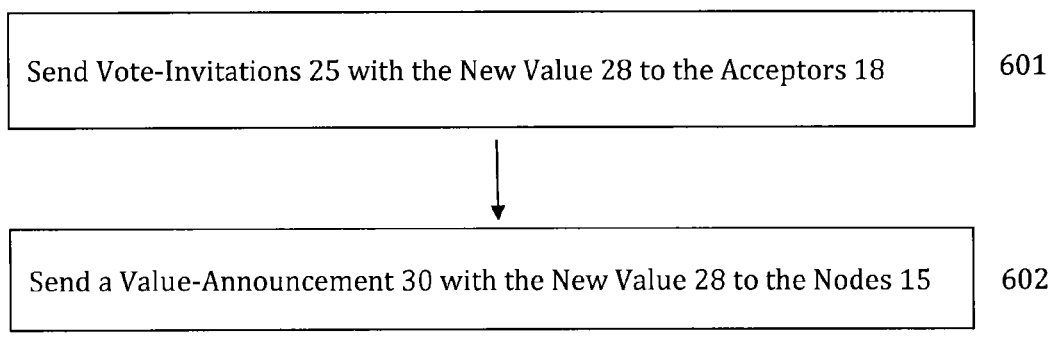
FIG. 6 shows a flowchart illustrating steps of an embodiment for vote-invitations and value-announcement, in accordance with certain embodiments of the invention.

The new value 28 may be selected upon receiving the last-voted-values 26 from a majority of the Acceptors 18. As shown in FIG. 6, in some embodiments, the method comprises the step of sending 601 vote-invitations 25 to the Acceptors 18 having the new value 28. In certain embodiments, a vote-announcement 30 may be sent 602 from the Acceptors 18 to the nodes 15 in the quorum 14. The value-announcement 30 may comprise the selected value 28. The nodes 15 in the quorum 14 may reject any value that is different from the selected new value 28.

A benefit of such embodiments is that the Coordinator 17 may not need to wait to receive round-acceptances 24 from all of the Acceptors 18, as a majority may suffice to ensure consistency or a consensus 9. Upon receiving a vote-invitation 25, each Acceptor 18 may send a vote-announcement 30 to all the nodes 15 in the quorum 14. Once a node 15 has received vote-announcements 30 from a majority of the quorum 14, the node 15 learns the new value 28. An important characteristic of this embodiment of the Paxos algorithm 12 is that it will necessarily fail to pick a value and stall if more than one Proposer 16 is proposing a value at the same time. It will never allow some nodes 15 to believe one value has been chosen while other nodes 15 believe a different value has been chosen. Details of how the algorithm 12 makes progress in the face of contention can be found in a series of papers referencing the Paxos algorithm 12 which was written by Leslie Lamport. These papers are available at http://research.microsoft.com/enus/um/people/lamport/pubs/pubs.html, and are hereby incorporated by reference.

Inodes 8 in KFS are encoded as ASN.1 values using the Distinguished Encoding Rules (DER) defined in ITU-T Recommendation X.690, which is hereby incorporated by reference. The use of DER affords several advantages over Java serialization, XML, or a homebrew, raw encoding scheme. DER produces encodings of values that are more compact than Java serialization and XML. Like Java serialization and XML, DER may be backward-compatible. New implementations may be able to decode values that were encoded by older implementations even if the type definitions in the older implementations were not designed with an upgrade path in mind. Raw encoding schemes rarely enjoy such flexibility. Furthermore, DER is an international standard that interoperates with numerous tools. Comparatively few tools are available to work with objects encoded using Java serialization. Decoding a value using DER does not require reflection, so it is usually faster than decoding a Java-serialized value. In addition, encoding and decoding via DER requires very minimal text processing. As such, it is usually much faster than XML.

In an embodiment of the presently disclosed system, the new Kademlia messages may be implemented. In accordance with the executed algorithms, processors send messages to one another. Such a message may comprise CMD_VALUE_ROUND_INVITE and CMD_VALUE_SET_ROUND_INVITE. The Coordinator 17 sends the Acceptor 18 the key 6, the generation-number 31, and the round-number 29. The Coordinator 17 invites an Acceptor 18 to participate in a Paxos round 22. This is the "Phase 1a" Paxos message.

In addition, another message may comprise CMD_VALUE_ROUND_ACCEPT and CMD_VALUE_SET_ROUND_ACCEPT where the Acceptor 18 sends the Coordinator 17 the key 6, the generation-number 31, the round-number 29, the last vote round 32, and the last vote value 26. The Acceptor 18 accepts a Coordinator's round-invitation 23 to participate in a Paxos round 22 and communicates the Acceptor's most recent vote 26. This is the "Phase 1b" Paxos message.

Another message sent by the Coordinator 17 may comprise CMD_VALUE_VOTE_INVITE and CMD_VALUE_SET_VOTE_INVITE. Accordingly, the Coordinator 17 sends the Acceptor 18 the key 6, the generation-number 31, the round-number 29, the majority-number 33, the learner-set 34, and the value 20. The Coordinator 17 invites an Acceptor 18 to vote for a particular value 20 in a Paxos round 22 and communicates the majority-number 33 of votes 21 needed for a majority and the set 34 of Learners 19 to which vote announcements 30 should be sent. This is the "Phase 2a" Paxos message.

In addition, another message for such an embodiment of the system may comprise CMD_VALUE_VOTE_ANNOUNCE and CMD_VALUE_SET_VOTE_ANNOUNCE, where the Acceptor 18 sends the Learner 19 the key 6, the generation-number 31, the round-number 29, the majority-number 33, and the value 20. The Acceptor 18 announces that the Acceptor 18 has cast a vote 21 for a particular value 20 and communicates the number of votes 21 needed for a majority. This is the "Phase 2b" Paxos message.

Another message may comprise CMD_VALUE_ROUND_BEGUN and CMD_VALUE_SET_ROUND_BEGUN. The Acceptor 18 sends the Coordinator 17 the key 6, the generation-number 31, and the round-number 29. The Acceptor 18 notifies the Coordinator 17 that the Acceptor 18 has already begun to participate in a higher round than that in which the Coordinator 17 invited the Acceptor 18 to participate. This is the "CA1" Paxos message.

Further, another message for such an embodiment of the system may comprise CMD_VALUE_INQUIRE and CMD_VALUE_SET_INQUIRE. Any agent sends any agent the key 6. An agent may request the current generation-number 31 and value for a key 6. This is a K-PAX extension.

Another message for such an embodiment may comprise CMD_VALUE_NOTIFY and CMD_VALUE_SET_NOTIFY. Any agent sends any agent the key 6, the generation-number 31, and the value 20. An agent may inform the receiver of the sender's currently known generation-number 31 and value for a key 6. This is a K-PAX extension.

In an embodiment, execution may proceed in phases. In phase 1, when an Acceptor 18 receives a round-invitation 23 from a Coordinator 17, certain actions may be performed. If the generation-number 31 in the round-invitation 23 is higher than the generation-number 31 on the Acceptor 18, the Acceptor 18 sends an inquiry 35 to the Coordinator 17. If the generation-number 31 in the round-invitation 23 is lower than the generation-number 31 on the Acceptor 18, the Acceptor 18 sends a notification 36 to the Coordinator 17. If the generation-number 31 in the round-invitation 23 is equal to the generation-number 31 on the Acceptor 18, then specific actions may be performed. If the round-number 29 in the round-invitation 23 is lower than the round-number 29 on the Acceptor 18, the Acceptor 18 sends a round-begun 37 to the Coordinator 17. If the round-number 29 in the round-invitation 23 is equal to the round-number 29 on the Acceptor 18, the Acceptor 18 ignores the round-invitation 23. If the round-number 29 in the round-invitation 23 is higher than the round-number 29 on the Acceptor 18, the Acceptor 18 updates its round-number 29 to match and sends a round-acceptance 24 to the Coordinator 17.

In an embodiment, a Coordinator 17 may receive a round-acceptance 24 from an Acceptor 18. If the generation-number 31 in the round-acceptance 24 is not equal to the generation-number 31 on the Coordinator 17, the Coordinator 17 ignores the round-acceptance 24. If the generation-number 31 in the round-acceptance 24 is equal to the generation-number 31 on the Coordinator 17, certain actions may be performed. If the round-number 29 in the round-acceptance 24 is not equal to the round-number 29 on the Coordinator 17, the Coordinator 17 ignores the round-acceptance 24. If the round-number 29 in the round-acceptance 24 is equal to the round-number 29 on the Coordinator 17, specific steps may follow. If the Coordinator 17 has already received a round-acceptance 24 from this Acceptor 18 in this generation and round 22, the Coordinator 17 ignores the round-acceptance 24. If the Coordinator 17 has not already received a round-acceptance 24 from this Acceptor 18 in this generation and round 22, the Coordinator 17 makes note of the last voted-value 26 cast by the Acceptor 18, as indicated in the round-acceptance 24.

In an embodiment, a Coordinator 17 may receive a round-acceptance 24 from a majority of the Acceptors 18 to which it sent round-invitations 23. From the last voted-value 26 that the Coordinator 17 received from the Acceptors 18, the Coordinator 17 picks the one that was cast in the highest-numbered round 22. If no Acceptors 18 indicated that they had yet voted in this generation, then the Coordinator 17 is free to pick a newly proposed value 20. The Coordinator 17 sends a vote-invitation 25 to each Acceptor 18. The vote-invitation 25 may be sent to all of the Acceptors 18, not just the majority that responded to the round-invitation 23.

In phase 2 of an embodiment, an Acceptor 18 may receive a vote-invitation 25 from a Coordinator 17. If the generation-number 31 in the vote-invitation 25 is not equal to the generation-number 31 on the Acceptor 18, the Acceptor 18 ignores the vote-invitation 25. If the generation-number 31 in the vote-invitation 25 is equal to the generation-number 31 on the Acceptor 18, then certain actions may be performed. If the round-number 29 in the vote-invitation 25 is less than the round-number 29 on the Acceptor 18, the Acceptor 18 sends a round-begun message 37 to the Coordinator 17. If the round-number 29 in the vote-invitation 25 is equal to or greater than the round-number 29 on the Acceptor 18, then certain steps may follow. If the Acceptor 18 has already voted in this generation and round 22, the Acceptor 18 ignores the vote-invitation 25. If the Acceptor 18 has not already voted in this generation and round 22, the Acceptor 18 sends a vote-announcement 30 to each Learner 19 indicated in the vote-invitation 25.

In an embodiment, a Learner 19 may receive a vote-announcement 30 from an Acceptor 18. If the generation-number 31 in the vote-announcement 30 is not equal to the generation-number 31 on the Learner 19, the Learner 19 ignores the vote-announcement 30. If the generation-number 31 in the vote-announcement 30 is equal to the generation-number 31 on the Learner 19, certain actions may be performed. If the round-number 29 in the vote-announcement 30 is less than the round-number 29 on the Learner 19, the Learner 19 ignores the vote-announcement 30. If the round-number 29 in the vote-announcement 30 is equal to or greater than the round-number 29 on the Learner 19, then specific steps may follow. If the Learner 19 has already received a vote-announcement 30 from this Acceptor 18 in this generation and round 22, the Learner 19 ignores the vote-announcement 30. If the Learner 19 has not already received a vote-announcement 30 from this Acceptor 18 in this generation and round 22, the Learner 19 makes note of the vote 21 cast by the Acceptor 18, as indicated in the vote-announcement 30.

In an embodiment, when a Learner 19 has received a vote-announcement from a majority of Acceptors 18. The number needed for a majority may be indicated in the vote-announcements. The vote-announcements may indicate votes for the same value. The Learner 19 may learn the new value indicated in the votes. The Learner 19 may increment its generation number in preparation for the next instance of the Paxos algorithm.

In an embodiment, when a Coordinator 17 receives a round-begun 37 from an Acceptor 18, specific conditional steps may be performed. If the generation-number 30 in the round-begun message 37 is not equal to the generation-number 31 on the Coordinator 17, the Coordinator 17 ignores the message 37. If the generation-number 31 in the message 37 is equal to the generation-number 31 on the Coordinator 17, then certain other behaviors are implemented. If the round-number 29 in the message 37 is less than or equal to the round-number 29 on the Coordinator 17, the Coordinator 17 ignores the message 37. If the round-number 29 in the message 37 is greater than the round-number 29 on the Coordinator 17, the Coordinator 17 selected a new round-number 29 that is greater than the round-number 29 in the message 37 and sends a round-invitation 23 to each Acceptor 18.

When a node 15 receives an inquiry 35, the receiver may send a notification 36 to the sender indicating the generation-number 31 and value 20 on the receiver. When a node 15 receives a notification 36, certain steps may follow. If the generation-number 31 in the notification 36 is less than the generation-number 31 on the receiver, the receiver ignores the notification 36. If the generation-number 31 in the notification 36 is equal to or greater than the generation-number 31 on the receiver, then the receiver may learn the value 20 indicated in the notification 36. Further, the receiver may set its generation-number 31 to one higher than the generation-number 31 in the notification 36 in preparation for the next instance of the Paxos algorithm 12.

It will be understood by those of ordinary skill in the art that the pseudo-code implementation and embodiments described herein representative of preferred embodiments of the present invention and are not limitative thereof.

In an embodiment of a system for storing files 4 across a plurality of storage devices 2 attached to a common network 3, the system may comprise a plurality of processors operably connected to the storage devices 2 and adapted to communicate across a common network 3. In addition, the system may comprise a distributed hash table 7 stored across said storage devices 2. The processors may be adapted to divide said files 4 into binary large objects 1 of a maximum predetermined size, store said binary large objects 1 in files on said storage devices 2, calculate a hash value 6 for said binary large objects 1, and store said hash value 6 in said distributed hash table 7. Further, the processors may be adapted to ensure consistency of said file system through the use of the Paxos algorithm 12. Files 4 may be stored across a distributed group of storage devices 2 in a consistent and reliable manner.

The term "data element" 5 shall mean a set of binary data containing a unit of information. Examples of data elements 5 include, without limitation, a packet of data flowing across a network 3; a row returned from a database query; a line in a digital file such as a text file, document file, or log file; an email message; a message system message; a text message; a binary large object; a digitally stored file; an object capable of storage in an object-oriented database; and an image file, music file, or video file. Data elements 5 often, but do not always, represent physical objects such as sections of a DNA molecule, a physical document, or any other binary representation of a real world object.

The term "instructions" shall mean a set of digital data containing steps to be performed by a computing device. Examples of "instructions" include, without limitation, a computer program, macro, or remote procedure call that is executed when an event occurs (such as detection of an input data element that has a high probability of falling within a particular category). For the purposes of this disclosure, "instructions" can include an indication that no operation is to take place, which can be useful when an event that is expected and has a high likelihood of being harmless has been detected, as it indicates that such event can be ignored. In certain preferred embodiments, "instructions" may implement state machines.

The term "machine readable storage" shall mean a medium containing random access or read-only memory that is adapted to be read from and/or written to by a computing device having a processor. Examples of machine readable storage shall include, without limitation, random access memory in a computer; random access memory or read only memory in a network device such as a router switch, gateway, network storage device, network security device, or other network device; a CD or DVD formatted to be readable by a hardware device; a thumb drive or memory card formatted to be readable by a hardware device; a computer hard drive; a tape adapted to be readable by a computer tape drive; or other media adapted to store data that can be read by a computer having appropriate hardware and software.

The term "network" or "computer network" shall mean an electronic communications network adapted to enable one or more computing devices to communicate by wired or wireless signals. Examples of networks include, but are not limited to, local area networks (LANs), wide area networks (WANs) such as the Internet, wired TCP and similar networks, wireless networks (including without limitation wireless networks conforming to IEEE 802.11 and the Bluetooth standards), and any other combination of hardware, software, and communications capabilities adapted to allow digital communication between computing devices.

The term "operably connected" shall mean connected either directly or indirectly by one or more cable, wired network, or wireless network connections in such a way that the operably connected components are able to communicate digital data from one to another.

The term "output" shall mean to render (or cause to be rendered) to a human-readable display such as a computer or handheld device screen, to write to (or cause to be written to) a digital file or database, to print (or cause to be printed), or to otherwise generate (or cause to be generated) a copy of information in a non-transient form. The term "output" shall include creation and storage of digital, visual and sound-based representations of information.

The term "server" shall mean a computing device adapted to be operably connected to a network such that it can receive and/or send data to other devices operably connected to the same network, or service requests from such devices. A server has at least one processor and at least one machine-readable storage media operably connected to that processor, such that the processor can read data from that machine-readable storage.

The term "system" shall mean a plurality of components adapted and arranged as indicated. The meanings and definitions of other terms used herein shall be apparent to those of ordinary skill in the art based upon the present disclosure.

Although some of the drawings illustrate a number of operations in a particular order, operations which are not order-dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof. The term "adapted" when used in this application shall mean programmed, configured, dimensioned, oriented and arranged as appropriate to the purpose or function described.

While the invention has been particularly shown and described with reference to an embodiment thereof, it will be understood by those skilled in the art that various changes in form and details may be made therein without departing from the spirit and scope of the invention.

What is claimed is:

1. The method for storing data, comprising the steps of: allocating data-elements of stored data-files to data-blocks, wherein the stored data-files are stored on a plurality of distributed devices, wherein the plurality of distributed devices are connected to a network, wherein the data-blocks are stored on the plurality of distributed devices; calculating key-identifiers for each of the data-blocks, wherein the key-identifiers are based on the allocated data-elements of the corresponding data-blocks; storing the key-identifiers in distributed tables, wherein the distributed tables are stored on the plurality of distributed devices; generating index-nodes for the data-files based on the data-blocks, wherein the index-nodes comprise a list of the data-blocks, wherein the index-nodes are stored in a metadata-store; and, executing a Paxos algorithm for the index-nodes based on the key-identifiers to provide a consensus of the data-files that are stored on the plurality of distributed devices.

2. The method of claim 1, wherein the key-identifiers comprise hash values, wherein the distributed tables are distributed hash tables.

3. The method of claim 1, wherein the data-blocks are binary large objects, wherein each of the binary large objects is less than a maximum predetermined size.

4. The method of claim 3, wherein each of the binary large objects is associated with a unique address, wherein each unique address is based on the allocated data-elements of the corresponding binary large object.

5. The method of claim 1, wherein the stored data-files are allocated to data-blocks based on a Kademlia algorithm.

6. The method of claim 1, wherein the data-blocks are logically grouped together, and wherein each one of the data-blocks are read and written as a single unit.

7. The method of claim 1, further comprising the step of: generating directory index-nodes for a plurality of index-nodes, wherein the directory index-nodes are stored in the metadata-store.

8. The method of claim 1, wherein the steps are performed by a plurality of processors operably connected to the distributed devices and adapted to communicate across the network.

9. The method of claim 1, wherein the key-identifiers are globally unique block-identifiers.

10. The method of claim 1, further comprising the steps of: receiving a request to modify an index-node; executing a Paxos algorithm for a quorum of nodes that correspond to the data-blocks having near-values in the distributed table, wherein the near-values are hash values that are within a predetermined range of a hash value of the index-node; modifying the index-node based on an outcome of the Paxos algorithm; and, modifying the nodes in the quorum based on the modified index-node, wherein a consensus of the nodes is provided based on the outcome of the Paxos algorithm.

11. The method of claim 10, wherein the consensus is provided by executing voting-rounds for a quorum of nodes.

12. The method of claim 11, wherein the voting-rounds comprise the steps of: sending round-invitations to the nodes in the quorum, wherein the nodes in the quorum are acceptors; receiving replies from each acceptor, wherein the replies are round-acceptances comprising a last-voted-value and a round-number, wherein the round-number represents the voting-round in which the corresponding acceptor voted the last-voted-value; and, selecting a value based the last-voted-values received from the acceptors.

13. The method of claim 12, further comprising the steps of: sending vote-invitations to the acceptors, wherein the vote-invitations comprise the selected value.

14. The method of claim 12, wherein the value is selected upon receiving the last-voted-values from a majority of the acceptors.

15. The method of claim 12, further comprising the steps of: sending a value-announcement from the acceptors to the nodes in the quorum, wherein the value-announcement comprises the selected value, wherein the nodes in the quorum reject a value that is different from the selected value.

16. The method of claim 1, wherein at least one of the index-nodes is encoded based on an Abstract Syntax Notation One (ASN. 1) encoding standard.

17. The method of claim 1, wherein at least one of the index-nodes is encoded based on a Distinguished Encoding Rules (DER) message-transfer syntax.

18. The method of claim 17, wherein the Distinguished Encoding Rules (DER) message-transfer syntax is based on a X.690 International Telecommunication Union (ITU)-T recommendation.

19. The method of claim 1, further comprising the steps of: receiving a round-invitation by an acceptor from a coordinator, wherein the round-invitation comprises a generation-number; sending an inquiry by the acceptor to the coordinator, only if the generation-number in the round-invitation is greater than a generation-number of the acceptor; sending a notification by the acceptor to the coordinator, only if the generation-number in the round-invitation is less than the generation-number of the acceptor; and, only if the generation-number in the round-invitation is equal to the generation-number of the acceptor, then: (i) sending a round-begun notification by the acceptor to the coordinator, only if a round-number in the round-invitation is less than the record-number of the acceptor; (ii) ignoring the round-invitation by the acceptor, only if the round-number in the round-invitation is equal to the round-number of the acceptor; and, (iii) updating the round-number in the acceptor to match the round-number in the round-invitation and sending a round-acceptance to the coordinator, only if the round-number in the round-invitation is greater than the round-number in the acceptor.

20. The method of claim 1, further comprising the steps of: receiving a round-acceptance by a coordinator from an acceptor, wherein the round-acceptance comprises a generation-number; ignoring the round-acceptance by the coordinator, only if the generation-number in the round-acceptance is different from the generation-number of the coordinator; and, only if the generation-number of the coordinator is equal to the generation-number of the round-acceptance, then: (i) ignoring the round-acceptance by coordinator, only if the round-number in the round-acceptance is different from the round-number on the coordinator; and, (ii) only if the round-number in the round-acceptance is equal to the round-number on the coordinator, then: (a) ignoring the round-acceptance by coordinator, only if the coordinator has already received a round-acceptance from the acceptor in the current generation and round; and, (b) tracking by the coordinator a last-voted-value in the round-acceptance received from the acceptor, only if the coordinator has not already received a round-acceptance from the acceptor in the current generation and round.

21. The method of claim 1, further comprising the steps of: receiving a round-acceptance by a coordinator from a majority of acceptors, wherein the majority of acceptors are acceptors that received round-invitations from the coordinator, wherein the round-acceptance comprises a generation-number; selecting, by the coordinator, a last-voted-value, wherein the last-voted-value is a value that the coordinator received from the acceptor in the highest-numbered round; only if the acceptors failed to vote in the current generation, selecting a proposed-value by the coordinator; and, sending, by the coordinator, a vote-invitation to each of the acceptors, wherein the vote-invitation is the proposed-value only if the acceptors failed to vote in the current generation, wherein the vote-invitation is the last-voted-value only if the acceptors voted in the current generation.

22. The method of claim 1, further comprising the steps of: receiving a vote-invitation by an acceptor from a coordinator, wherein the vote-invitation comprises a generation-number; ignoring the vote-invitation by the acceptor, only if the generation-number in the vote-invitation is different from the generation-number on the acceptor; and, only if the generation-number of the acceptor is equal to the generation-number of the vote-acceptance, then: (i) sending a round-begun notification by the acceptor to the coordinator, only if a round-number in the vote-invitation is less than the record-number of the acceptor; and, (ii) only if a round-number in the vote-invitation is equal to the record-number of the acceptor, then: (a) ignoring the vote-acceptance by acceptor, only if the acceptor has already voted in the current generation and round; and, (b) sending a vote-announcement from the acceptor to learners listed in the vote-invitation, only if the acceptor has not already voted in the current generation and round.

23. The method of claim 1, further comprising the steps of: receiving a vote-announcement by a learner from an acceptor, wherein the vote-announcement comprises a generation-number; ignoring the vote-announcement by the learner, only if the generation-number in the vote-announcement is different from the generation-number of the learner; and only if the generation-number of the learner is equal to the generation-number of the vote-announcement, then: (i) ignoring the vote-announcement by the learner, only if the round-number in the vote-announcement is less than the round-number of the learner; and, (ii) only if a round-number in the vote-announcement is equal to or greater than the record-number of the learner, then: (a) ignoring the vote-acceptance by learner, only if the learner has already received a vote-announcement from the acceptor in the current generation and round; and, (b) tracking by the learner the vote received from the acceptor, only if the learner has not already received a vote-announcement from the acceptor in the current generation and round.

24. The method of claim 1, further comprising the steps of: receiving a vote-announcement by a learner from a majority of acceptors, wherein the vote-announcements have a pre-determined majority-number for determining a quantity needed for the majority of acceptors, wherein the vote-announcements comprise a generation-number and a value; and, only if the values of all of the vote-announcements are equal, then the learner tracks the value of the vote-announcements and the learner increments the generation-number for a next-iteration of the Paxos algorithm.

25. The method of claim 1, further comprising the steps of: receiving a round-begun notification by the coordinator to the acceptor; ignoring the round-begun notification by the coordinator, only if the generation-number in the round-begun notification is different from the generation-number on the coordinator; and, only if the generation-number in the round-begun notification is equal to the generation-number on the coordinator, then: (i) ignoring the round-begun notification by the coordinator, only if the round-number in the round-begun notification is less than or equal to the round-number on the coordinator; and, (ii) selecting, by the coordinator, a new round-number that is greater than the round-number in the round-begun notification and sending a round-invitation to each of the acceptors, only if the round-number in the round-begun notification is greater than the round-number on the coordinator.

26. The method of claim 1, further comprising the steps of: receiving an inquiry from a sender by a receiver, wherein the sender is a sending-node, wherein the receiver is a receiving-node; sending a notification by the receiver to the sender, wherein the notification comprises a generation-number and a value of the receiver; and, only if the sender receives the notification, then: (i) ignoring the notification by the receiver, only if the generation-number in the notification is less than the generation-number of the receiver; and, (ii) only if the generation-number in the notification is equal to or greater than the generation-number on the receiver, then the receiver tracks the value in the notification and the receiver sets the generation-number in the receiver to a number equal to one value greater than the generation-number in the notification for the next-iteration of the Paxos algorithm.

* * * * *